(12) United States Patent
Thiewes et al.

(10) Patent No.: US 8,753,109 B2
(45) Date of Patent: Jun. 17, 2014

(54) DEVICE FOR PROVIDING A GAS/COMBUSTION AIR MIXTURE FOR A GAS BURNER

(75) Inventors: Roelof Thiewes, Odoorn (NL); Enno Vrolijk, Dalen (NL)

(73) Assignee: Honeywell Technologies Sarl, Rolle (CH)

( * ) Notice: Subject to any disclaimer, the term of this patent is extended or adjusted under 35 U.S.C. 154(b) by 1078 days.

(21) Appl. No.: 12/741,355

(22) PCT Filed: Oct. 25, 2008

(86) PCT No.: PCT/EP2008/009045
§ 371 (c)(1),
(2), (4) Date: Jul. 19, 2010

(87) PCT Pub. No.: WO2009/059703
PCT Pub. Date: May 14, 2009

(65) Prior Publication Data
US 2010/0297568 A1 Nov. 25, 2010

(30) Foreign Application Priority Data
Nov. 5, 2007 (DE) .......................... 10 2007 053 028

(51) Int. Cl.
*F23M 5/00* (2006.01)

(52) U.S. Cl.
USPC ........................ 431/114; 431/354; 126/110 C

(58) Field of Classification Search
USPC ............ 431/12, 114, 354; 126/110 R, 110 C, 126/116 A; 285/45, 48, 49, 55
See application file for complete search history.

(56) References Cited

U.S. PATENT DOCUMENTS

| 4,198,078 A * | 4/1980 | Herbert | 285/49 |
| 6,250,913 B1 * | 6/2001 | Maton | 431/354 |
| 6,702,333 B1 * | 3/2004 | Oetiker | 285/49 |

(Continued)

FOREIGN PATENT DOCUMENTS

| DE | 102004007123 B3 * | 8/2005 |
| DE | 102005020303 A1 * | 11/2006 |

(Continued)

OTHER PUBLICATIONS

Machine Translation (EPO) of DE102004007123 dated Jul. 24, 2013.*

(Continued)

*Primary Examiner* — John K Fristoe, Jr.
*Assistant Examiner* — Jessica Cahill
(74) *Attorney, Agent, or Firm* — Seager Tufte & Wickhem LLC

(57) ABSTRACT

The invention relates to a device for providing a gas/combustion air mixture for a gas burner, comprising a fan (11) for providing a combustion air flow, a gas control device for providing a gas flow and a mixing device (13) for mixing the combustion air flow and the gas flow, thus providing the gas/combustion air mixture. Said mixing device (13) and the fan (11) are connected together on one side, and on the other side, the mixing device and the gas control device are connected together. According to the invention, the mixing device (13) and the fan (11) are connected together in such a manner that a vibration absorber (15) is arranged between a connecting section (12) of the mixing device (13) and a connecting section (10) of the fan (11).

20 Claims, 6 Drawing Sheets

(56) References Cited

U.S. PATENT DOCUMENTS

Figure 1:
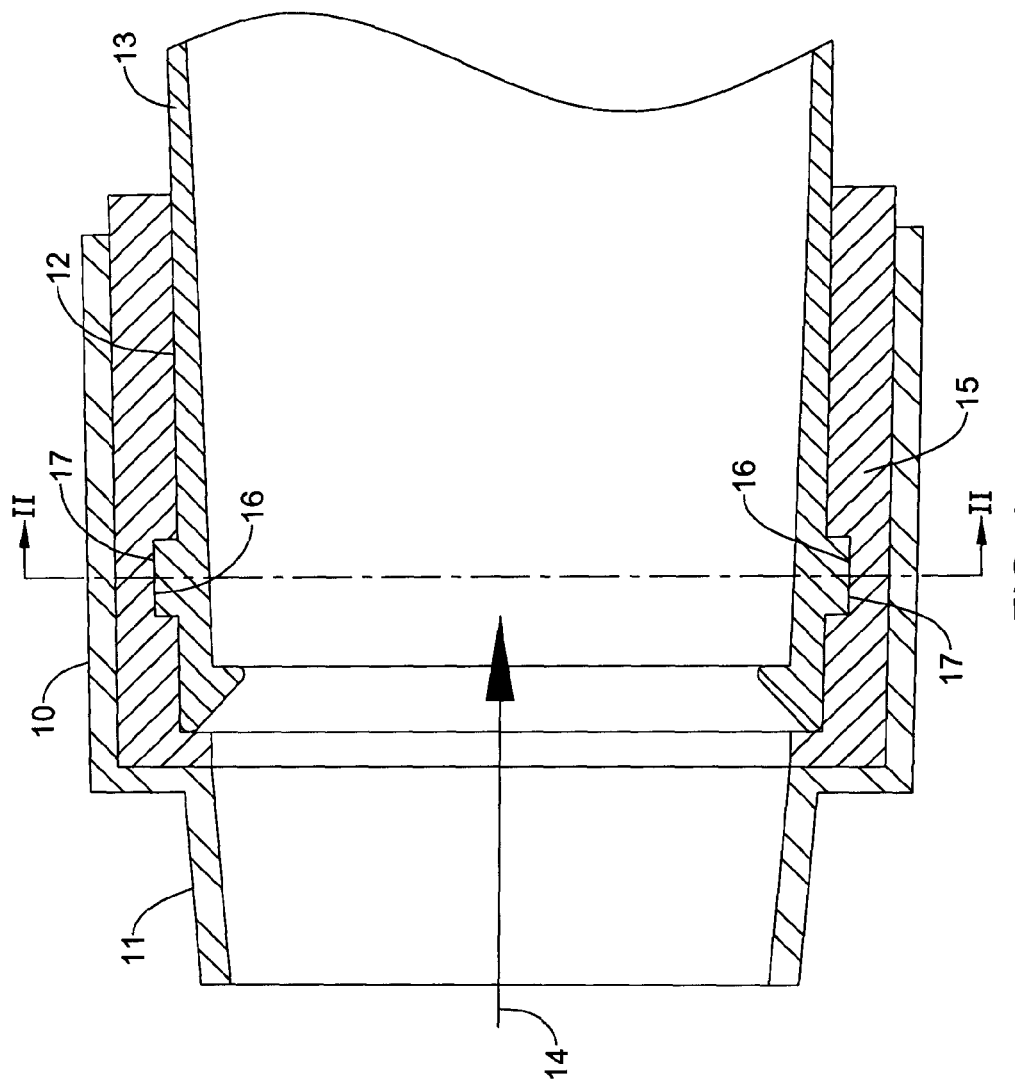

| | | | |
|---|---|---|---|
| 2001/0014437 A1* | 8/2001 | Damrath et al. | 431/354 |
| 2006/0051718 A1* | 3/2006 | Kamal et al. | 431/354 |
| 2007/0243496 A1* | 10/2007 | Thiewes et al. | 431/354 |

FOREIGN PATENT DOCUMENTS

| | | | |
|---|---|---|---|
| EP | 1099906 A1 * | 5/2001 | |
| EP | 1635116 A2 * | 3/2006 | |
| EP | 1707878 A2 * | 10/2006 | |
| WO | 02077526 | 10/2002 | |
| WO | WO 2005078343 A1 * | 8/2005 | |

OTHER PUBLICATIONS

Machine Translation (EPO) of DE102005020303 dated Jul. 24, 2013.*
Machine Translation (EPO) of EP1099906 dated Jul. 24, 2013.*
Machine Translation (EPO) of EP1635116 dated Jul. 24, 2013.*
Machine Translation (EPO) of EP1707878 dated Jul. 24, 2013.*
Machine Translation (EPO) of WO2005078343 dated Jul. 24, 2013.*

* cited by examiner

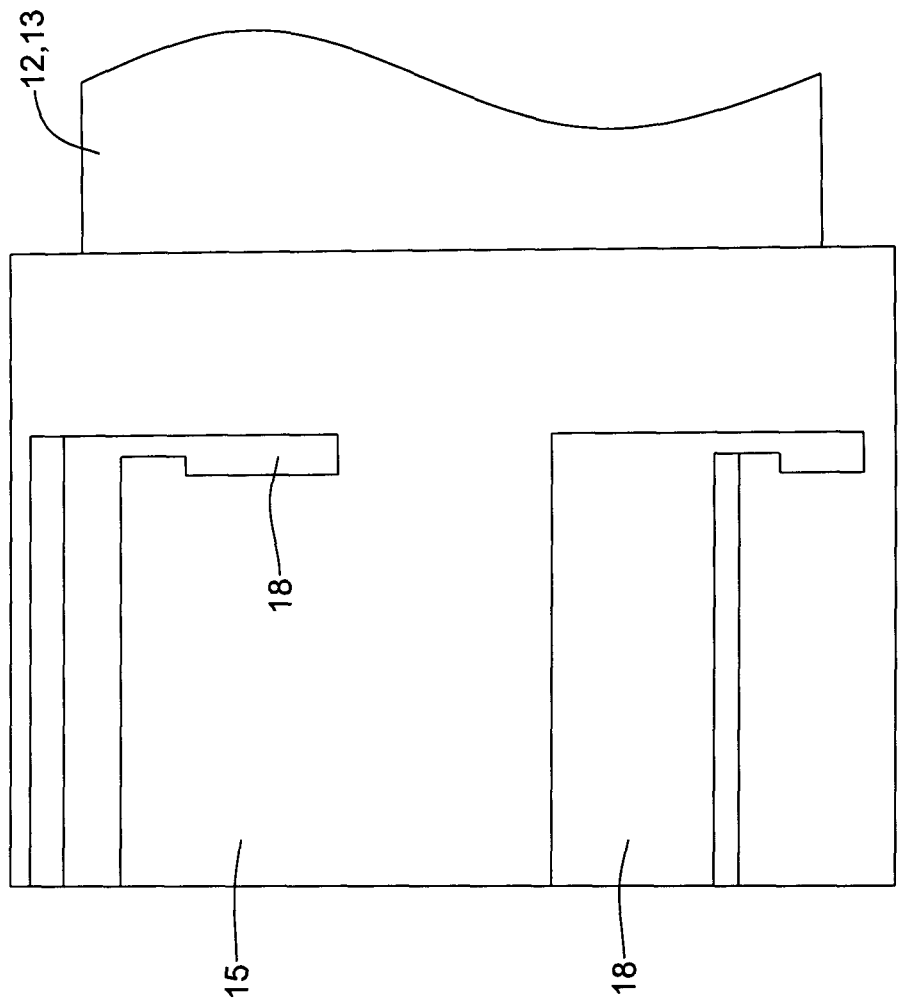

DEVICE FOR PROVIDING A GAS/COMBUSTION AIR MIXTURE FOR A GAS BURNER

The invention refers to a device for providing a gas/combustion air mixture for a gas burner according to the preamble of claim 1.

A device for providing a gas/combustion air mixture for a gas burner, which comprises a gas regulating device, a mixing device with a Venturi nozzle and a fan, is known from DE 10 2004 007 123 B3. According to this prior art, the gas regulating device is connected to the mixing device and the mixing device is connected to the fan, wherein the mixing device acts on a support plate of the fan upstream of said fan. Fastening of the mixing device on the support plate of the fan in this case is sealed via a sealing device.

During operation, the fan of such a device for providing a gas/combustion air mixture, as result of the rotation of an electric motor and also of an impeller of the fan, can trigger mechanical vibrations or oscillations which lead to an undesirable, annoying noise development on the device for providing a gas/combustion air mixture. Such noise development is seen as an annoyance and must consequently be avoided.

Starting from here, the invention is based on the problem of creating a new type of device for providing a gas/combustion air mixture for a gas burner.

This problem is solved by means of a device with the features of claim 1. According to the invention, the mixing device and the fan are interconnected in such a way that a vibration absorber is arranged between a connecting section of the mixing device and a connecting section of the fan.

Within the meaning of the invention which is under consideration here, it is proposed to position a vibration absorber between the connecting section of the mixing device and the connecting section of the fan, which absorbs mechanical vibrations or oscillations which are triggered by the fan and therefore counteracts undesirable noise development.

Figure 1A:
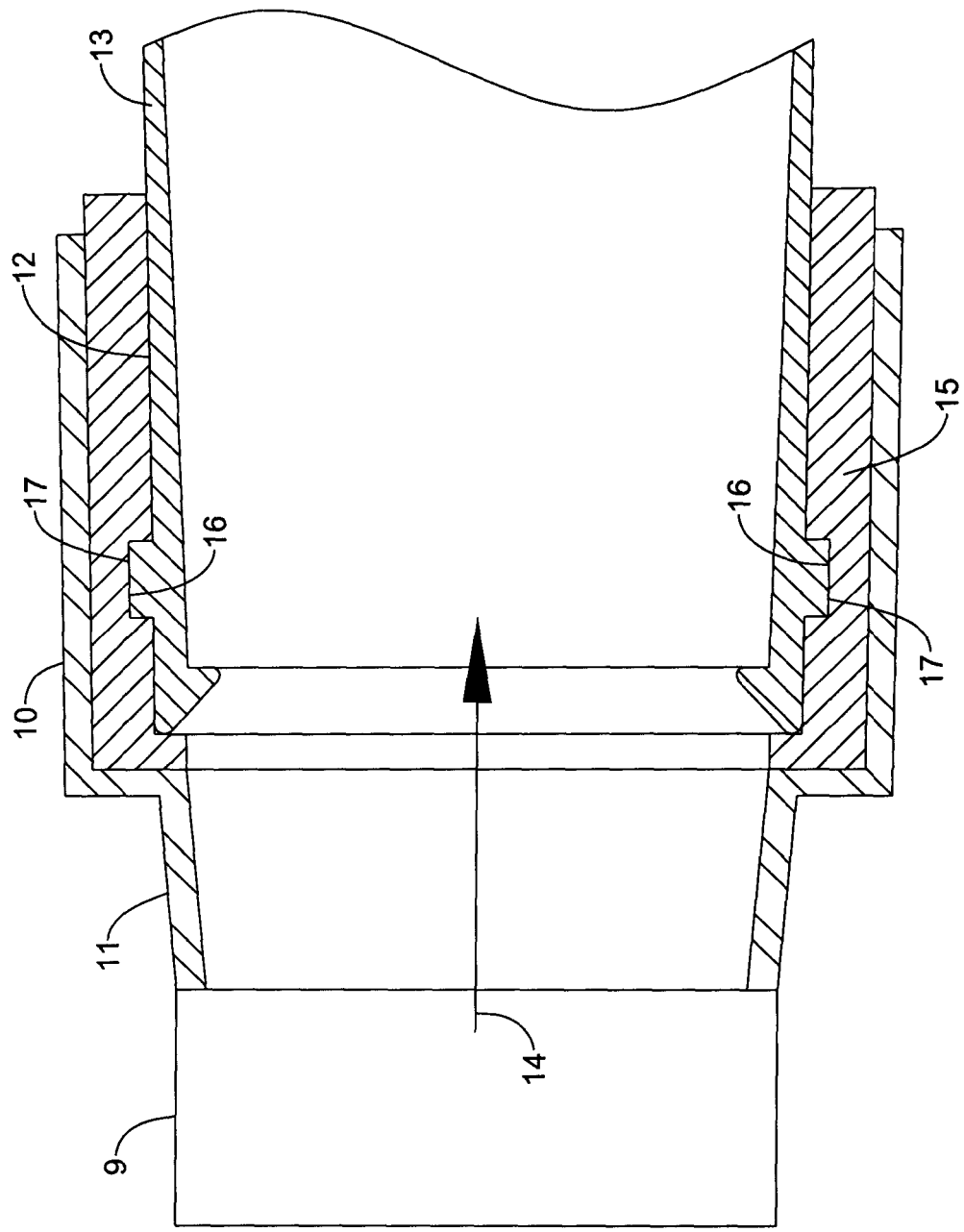
Figure 2:
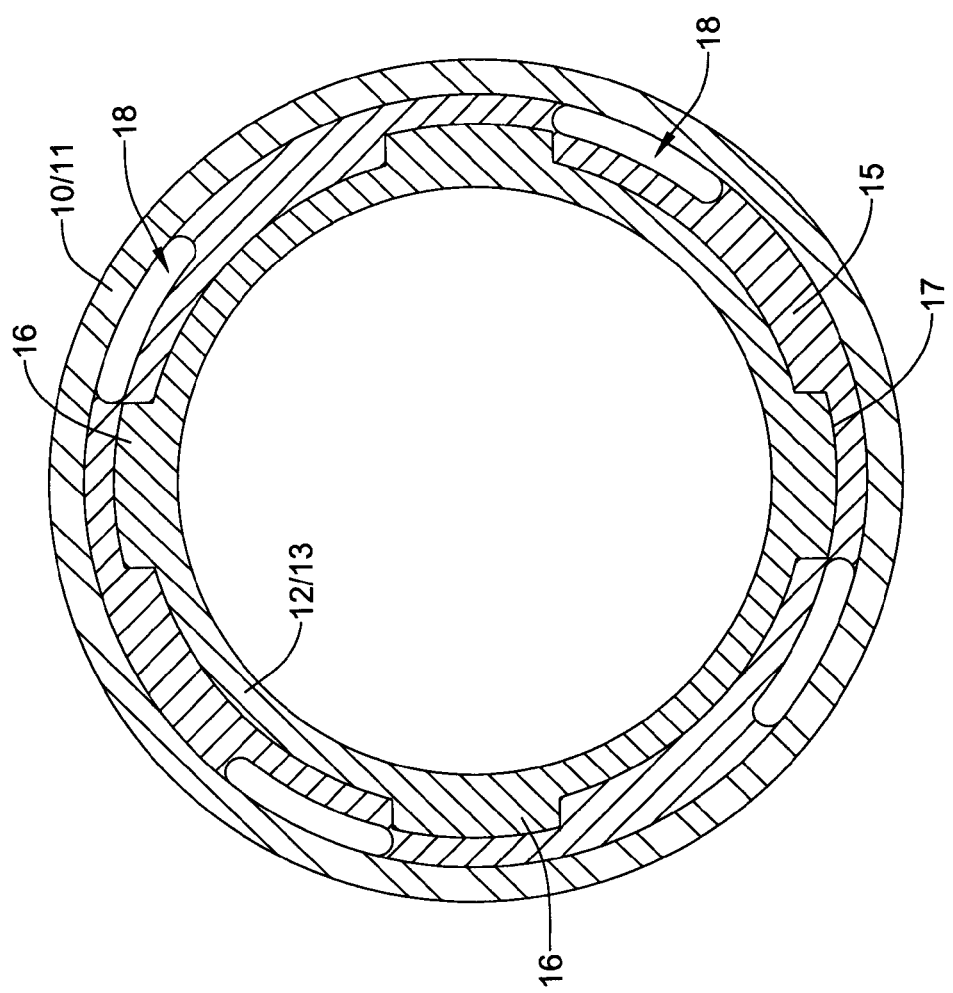
Figure 2A:
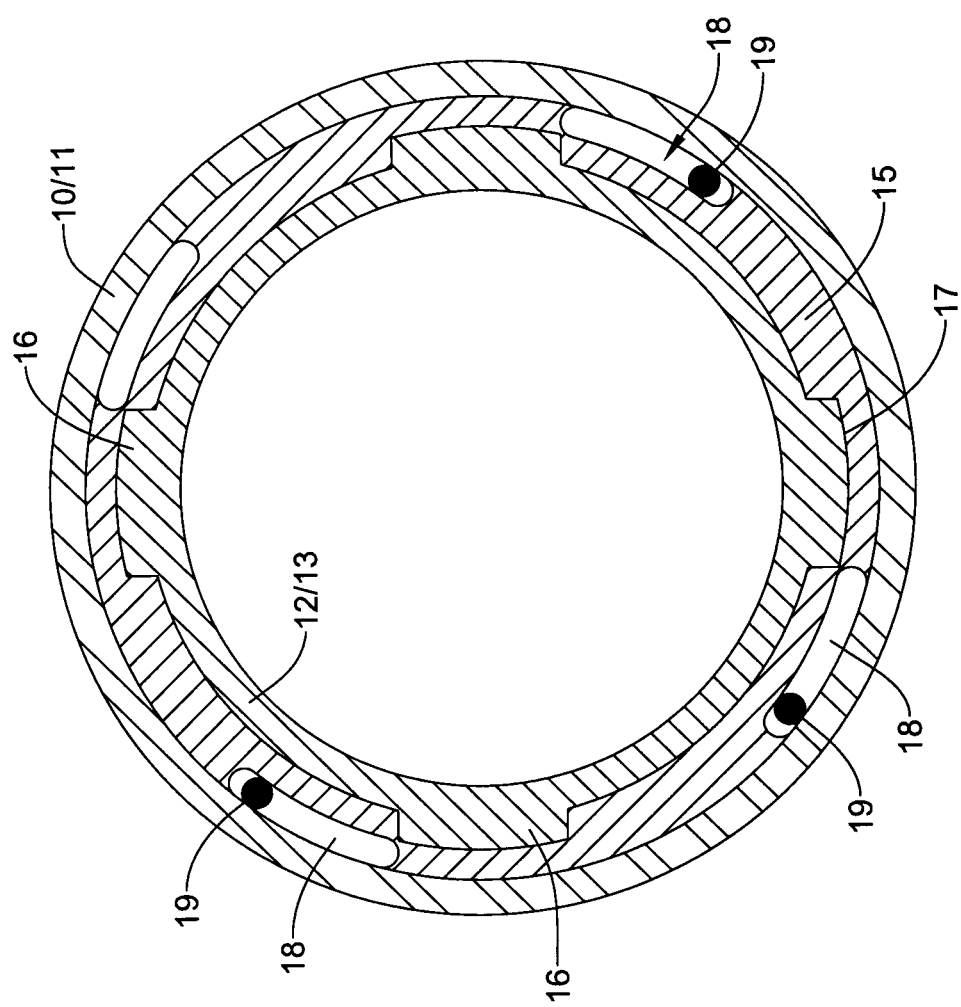

Preferred developments of the invention result from the dependent claims and from the following description. Exemplary embodiments of the invention, without being limited thereto, are subsequently explained in more detail with reference to the drawing. In the drawing:

FIG. 1: shows a detailed cross section through a device according to the invention for providing a gas/combustion air mixture for a gas burner;

FIG. 1A: shows a partial cross-sectional view of the device according to the invention for providing a gas/combustion air mixture for a gas burner;

FIG. 2: shows a cross section through the arrangement of FIG. 1 in the direction of cut and FIG. 2A: shows a cross section through the arrangement of FIG. 1 in the direction of cut II-II.

Figure 4:
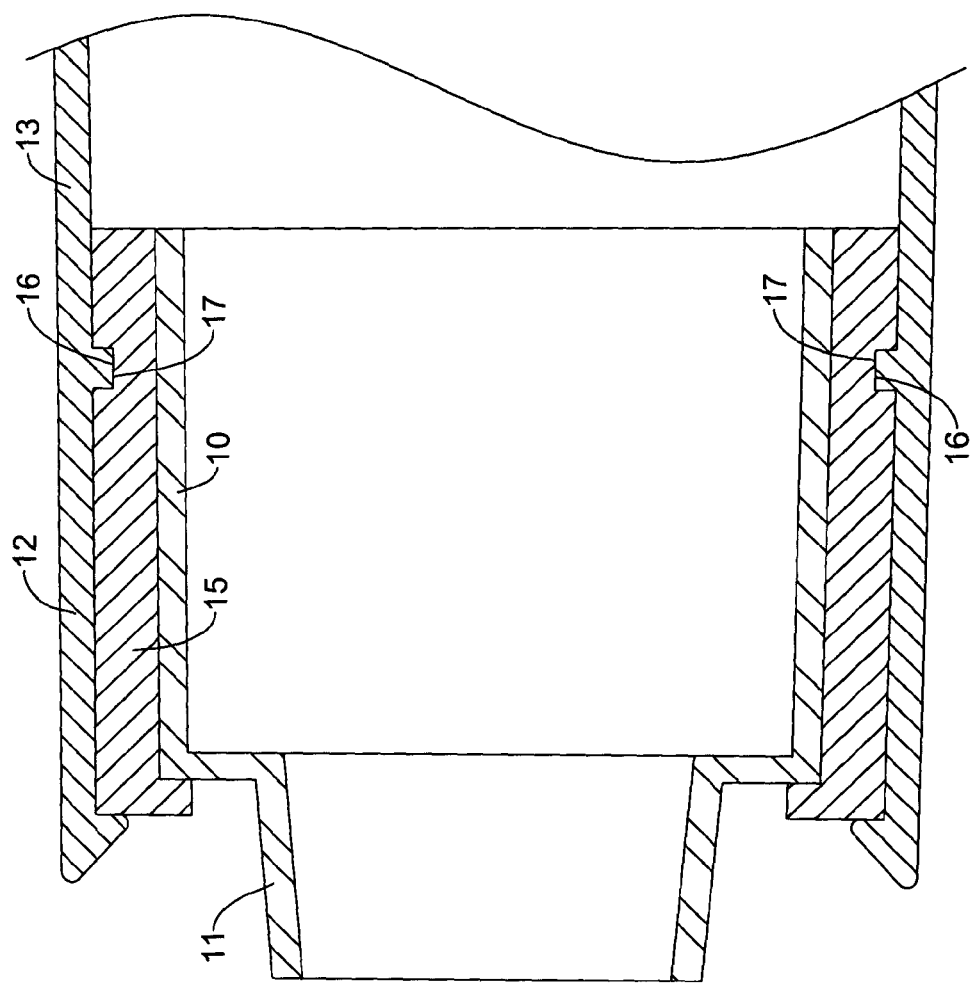

FIG. 3: shows a detail of the arrangement of FIG. 1;

FIG. 4: a shows a partial cross-sectional view of the device according to another embodiment of the invention for providing a gas/combustion air mixture for a gas burner.

The invention which is under consideration here refers to a device for providing a gas/combustion air mixture for a gas burner, wherein the device comprises a gas regulating device for providing a gas flow, a fan for providing a combustion air flow, and a mixing device for mixing the combustion air flow and the gas flow and therefore for providing the gas/combustion air mixture. The mixing device in this case comprises a Venturi nozzle and/or a metering nozzle.

The mixing device 13 and the fan 11 are interconnected as shown in FIGS. 1, 1A, 2 and 2A. The mixing device 13 and the gas regulating device 9 are also interconnected, as shown in FIG. 1A. FIGS. 1, 1A, 2, and 2A show cross sections through a device according to the invention for providing a gas/combustion air mixture in the connecting region between the mixing device 13 and the fan 11.

Thus, FIG. 1 shows a connecting section 10 of a fan 11 and a connecting section 12 of a mixing device 13, wherein the mixing device 13 and the fan 11 are interconnected in such a way that the connecting section 10 of the fan 11 concentrically encompasses the connecting section 12 of the mixing device 13. As already mentioned, the fan 11 serves for providing a combustion air flow which flows through the fan 11 in the direction of the arrow 14 and enters the mixing device 13. In the exemplary embodiment which is shown, the mixing device 13 is therefore positioned downstream of the fan 11 and acts on the fan 11 downstream of this. Reference should be made to the fact that, in contrast to the exemplary embodiment which is shown, the mixing device 13 can also act on the fan 11 upstream of this.

Within the meaning of the invention which is under consideration here, a vibration absorber 15 is positioned between the connecting section 10 of the fan 11 and the connecting section 12 of the mixing device 13, wherein the vibration absorber 15 is formed from a relatively soft, elastic material. The vibration absorber 15 is especially formed from an elastomer material.

The vibration absorber can absorb mechanical vibrations or oscillations which are created by the fan 11 or by a motor and impeller of the fan 11 in order to thus avoid an oscillation especially between the connecting sections 10, 12 of fan 11 and mixing device 13 and therefore to avoid undesirable noise development.

In the exemplary embodiment which is shown, in which the connecting section 10 of the fan 11 concentrically encompasses the connecting section 12 of the mixing device 13, the vibration absorber 15 concentrically encompasses the connecting section 12 of the mixing device 13, in the same way as the connecting section 10 of the fan 11 concentrically encompasses the vibration absorber 15.

According to an advantageous development of the invention which is under consideration here, the vibration absorber 15, which is formed from a relatively soft, elastic material, is slipped around the connecting section 12 of the mixing device 13 and fixed in its relative position to the connecting section 12 of the mixing device 13, specifically by projections 16 of the connecting section 12 of the mixing device 13 engaging in recesses 17 of the vibration absorber 15. As a result of this, the relative position of vibration absorber 15 and connecting section 12 of the mixing device 13 can be fixed both in the circumferential direction and in the axial direction.

The connecting section 10 of the fan 11 is arranged around the vibration absorber 15 by means of a bayonet connector and by means of said bayonet connector is fixed in its relative position to the vibration absorber 15, wherein slots 18 of the bayonet connector are associated with the vibration absorber 15 and pins 19 of the bayonet connector which engage in the slots 18 are associated with the connecting section 10 of the fan 11.

It can be gathered from the figures that the projections 16 of the connecting section 12 of the fan 13 are associated with an outer wall of the connecting section 12. The recesses 17, in which the projections engage, are associated with an inner wall of the vibration absorber 15. The slots 18 for the bayonet connector, on the other hand, are associated with an outer wall of the vibration absorber 15. The corresponding pins 19 of the bayonet connector are associated with an inner wall of the connecting section 10 of the fan 11.

In contrast to the exemplary embodiment which is shown, it is also possible for the vibration absorber to concentrically encompass a connecting section of a fan and for the connecting section of the mixing device to concentrically encompass the vibration absorber.

Also, in contrast to the exemplary embodiment which is shown, the interacting projections 16 and recesses 17 which serve for the fixing of the vibration absorber 15 on the connecting section 12 of the mixing device 13, and also the interacting slots and pins of the bayonet connector which serve for the fixing of the connecting section 10 of the fan 11 on the vibration absorber 15, can be associated in each case with the other component. Therefore, in contrast to the exemplary embodiment which is shown, it is possible for the projection 16 to be associated with the vibration absorber 15 and for the recesses 17 to be associated with the connecting section 12 of the mixing device 13. It is also possible for slots of the bayonet connector to be associated with the connecting section 10 of the fan 11 and for corresponding pins of the bayonet connector to be associated with the vibration absorber 15.

As can be gathered from FIG. 1, on an upstream end the vibration absorber 15 forms a stop for the connecting section 12 of the mixing device 13. In the same way the connecting section 10 of the fan 11 forms a stop for the upstream end of the vibration absorber 15. These stops also serve for the fixing of the relative position of the sub-assemblies to each other in the axial direction.

As a result of using an elastic vibration absorber, mechanical vibrations between the connecting section 12 of the mixing device 13 and the connecting section 10 of the fan 11, which are induced by the fan 11, are absorbed, as a result of which undesirable noise development of the device according to the invention for providing a gas/combustion air mixture can be avoided.

Furthermore, a simple and quick connectability of the individual sub-assemblies to each other is ensured.

According to FIG. 3, slots 18 of the bayonet connector are offset to each other in the circumferential direction so that the fan 11 can consequently act in different circumferential positions relative to the vibration absorber 15 and therefore to the connecting section 12 of the mixing device 13.

LIST OF DESIGNATIONS

10 Connecting section
11 Fan
12 Connecting section
13 Mixing device
14 Combustion air flow
15 Vibration absorber
16 Projection
17 Recess
18 Slot

The invention claimed is:

1. A device for providing a gas/combustion air mixture for a gas burner, with a fan for providing a combustion air flow, with a gas regulating device for providing a gas flow, and with a mixing device for mixing the combustion air flow and the gas flow and therefore for providing the gas/combustion air mixture, wherein on one side of the mixing device, the mixing device and the fan are interconnected, and on the other side of the mixing device, the mixing device and the gas regulating device are interconnected, and wherein a vibration absorber is arranged between a connecting section of the mixing device and a connecting section of the fan, wherein the connecting section of the mixing device and the connecting section of the fan extend along a longitudinal axis of the device, and wherein the vibration absorber includes an engagement feature for mechanically engaging with a corresponding engagement feature of the device to form an interference connection, wherein the engagement feature of the vibration absorber is configured to restrict movement of the vibration absorber relative to the corresponding engagement feature of the device along the longitudinal axis in both directions.

2. The device of claim 1, wherein the vibration absorber is formed from an elastomeric material.

3. The device of claim 1, wherein the vibration absorber concentrically encompasses the connecting section of the fan, and the connecting section of the mixing device concentrically encompasses the vibration absorber.

4. The device of claim 1, wherein the mixing device is positioned downstream of the fan.

5. The device of claim 1, wherein the mixing device is positioned upstream of the fan.

6. The device of claim 1, wherein the mixing device forms a Venturi nozzle.

7. The device of claim 1, wherein the mixing device forms a metering nozzle.

8. The device of claim 1, wherein the vibration absorber concentrically encompasses the connecting section of the mixing device, and the connecting section of the fan concentrically encompasses the vibration absorber.

9. The device of claim 8, wherein the engagement feature of the vibration absorber include one or more recesses, and wherein the vibration absorber is slipped around the connecting section of the mixing device and fixed in its relative position to the connecting section of the mixing device by one or more projections of the connecting section of the mixing device mechanically engaging the one or more recesses of the vibration absorber.

10. The device of claim 8, wherein the connecting section of the fan is arranged around the vibration absorber and fixed in its relative position to the vibration absorber via a bayonet connector that includes one or more slots, wherein the one or more slots of the bayonet connector are associated with the vibration absorber, and one or more pins of the bayonet connector are associated with the connecting section of the fan.

11. An apparatus for providing a gas/combustion air mixture to a gas burner, comprising:
a gas regulating device for providing a gas flow;
a fan for providing a combustion air flow, the fan having a connecting section;
a mixing device for mixing the combustion air flow and the gas flow to produce the gas/combustion air mixture, the mixing device having a connecting section; and
a vibration absorber arranged between the connecting section of the mixing device and the connecting section of the fan, wherein the connecting section of the mixing device and the connecting section of the fan extend along a longitudinal axis of the device, and wherein the vibration absorber includes one or more engagement feature each for mechanically engaging one or more corresponding engagement feature along the connecting sections of the mixing device and/or fan to form an interference connection that mechanically secures the vibration absorber such that movement of the vibration absorber is restricted along the longitudinal axis in both directions.

12. The apparatus of claim 11, wherein the vibration absorber is formed from an elastomeric material.

13. The apparatus of claim 11, wherein the vibration absorber concentrically encompasses the connecting section of the fan, and the connecting section of the mixing device concentrically encompasses the vibration absorber.

14. The apparatus of claim 11, wherein the vibration absorber concentrically encompasses the connecting section of the mixing device, and the connecting section of the fan concentrically encompasses the vibration absorber.

15. The apparatus of claim 14, wherein the one or more engagement features of the vibration absorber include one or more recesses, and wherein the vibration absorber is arranged around the connecting section of the mixing device and fixed in its relative position to the connecting section of the mixing device by one or more projections of the connecting section of the mixing device mechanically engaging the one or more recesses of the vibration absorber.

16. The apparatus of claim 14, wherein the connecting section of the fan is arranged around the vibration absorber and fixed in its relative position to the vibration absorber via a bayonet connector that includes one or more slots, wherein the one or more slots of the bayonet connector are associated with the vibration absorber, and one or more pins of the bayonet connector are associated with the connecting section of the fan.

17. A device for directing a gas/combustion air mixture to a gas burner, comprising:
   a fan, the fan having a connecting section;
   a mixing device, the mixing device having a connecting section, wherein the connecting section of the fan and the connecting section of the mixing device are concentrically arranged along a longitudinal axis; and
   a vibration absorber situated between the concentrically arranged connecting sections of the mixing device and the fan, wherein the vibration absorber is formed from an elastomeric material, and wherein the vibration absorber is held in place by an interlocking connection between an engagement feature of the vibration absorber and a corresponding engagement feature of the device that secures the vibration absorber in place such that movement of the vibration absorber is restricted along the longitudinal axis in both directions.

18. The device of claim 17, wherein the vibration absorber is arranged around the connecting section of the mixing device, and the connecting section of the fan is arranged around the vibration absorber.

19. The device of claim 17, wherein the vibration absorber is arranged around the connecting section of the fan, and the connecting section of the mixing device is arranged around the vibration absorber.

20. The device of claim 17, wherein the vibration absorber is fixed relative to the connecting section of the fan and/or the connecting section of the mixing device via a bayonet connector.

* * * * *